United States Patent
Dobson, Jr. et al.

(10) Patent No.: US 9,725,637 B2
(45) Date of Patent: Aug. 8, 2017

(54) EARTH METAL PEROXIDE FLUIDIZED COMPOSITIONS

(71) Applicant: TUCC Technology, LLC, Houston, TX (US)

(72) Inventors: James W. Dobson, Jr., Houston, TX (US); Shauna L. Hayden, Houston, TX (US); Kim O. Tresco, Houston, TX (US)

(73) Assignee: TUCC Technology, LLC, Houston, TX (US)

( * ) Notice: Subject to any disclaimer, the term of this patent is extended or adjusted under 35 U.S.C. 154(b) by 543 days.

(21) Appl. No.: 13/759,996

(22) Filed: Feb. 5, 2013

(65) Prior Publication Data

US 2013/0206416 A1    Aug. 15, 2013

Related U.S. Application Data

(60) Provisional application No. 61/595,106, filed on Feb. 5, 2012.

(51) Int. Cl.
| | |
|---|---|
| *C09K 8/64* | (2006.01) |
| *E21B 43/26* | (2006.01) |
| *C09K 8/32* | (2006.01) |
| *C09K 8/60* | (2006.01) |

(52) U.S. Cl.
CPC .................. *C09K 8/64* (2013.01); *C09K 8/32* (2013.01); *C09K 8/607* (2013.01); *E21B 43/26* (2013.01)

(58) Field of Classification Search
None
See application file for complete search history.

(56) References Cited

U.S. PATENT DOCUMENTS

| | | |
|---|---|---|
| 6,702,023 B1 | 3/2004 | Harris et al. |
| 2003/0114314 A1 | 6/2003 | Ballard et al. |
| 2005/0087341 A1* | 4/2005 | McCabe .................. C09K 8/64 166/278 |

(Continued)

FOREIGN PATENT DOCUMENTS

| | | |
|---|---|---|
| WO | 97/04038 A1 | 2/1997 |
| WO | 2002/055843 A1 | 7/2002 |

(Continued)

OTHER PUBLICATIONS

Supplementary European Search Report regarding corresponding European Application No. 13742941.1, dated Jun. 23, 2015.

(Continued)

*Primary Examiner* — Alicia Bland
(74) *Attorney, Agent, or Firm* — Lewis, Reese & Nesmith, PLLC

(57) ABSTRACT

Disclosed is an alkaline earth metal peroxide concentrate, or fluidized suspension, for addition to aqueous hydraulic fracturing fluids to efficiently decrease the viscosity of the hydrated, hydrophilic polysaccharide polymer in the system. The concentrate comprises a hydrophobic, water insoluble liquid, an organophilic clay suspension agent, a polar activator, a sparingly-soluble alkaline earth metal peroxide, and an anionic surfactant. Advantageously, these concentrations, or suspensions, exhibit high flash points, making them easier to transport using commercial transportation means.

16 Claims, 1 Drawing Sheet

: Calcium Peroxide Suspension Comparison.

(56) References Cited

U.S. PATENT DOCUMENTS

| | | |
|---|---|---|
| 2006/0198876 A1 | 9/2006 | Tichy et al. |
| 2006/0276347 A1* | 12/2006 | Lin .......................... C09K 8/58 507/209 |
| 2008/0318812 A1* | 12/2008 | Kakadjian, Sr. ....... C09K 8/035 507/221 |
| 2009/0308599 A1 | 12/2009 | Dusterhoft et al. |
| 2010/0099587 A1 | 4/2010 | Welton et al. |

FOREIGN PATENT DOCUMENTS

| | | |
|---|---|---|
| WO | 2008/134371 A2 | 11/2008 |
| WO | 2011/064631 A1 | 6/2011 |

OTHER PUBLICATIONS

International Search Report and Written Opinion regarding corresponding PCT Application No. PCT/US2013/024798, dated May 30, 2013.

* cited by examiner

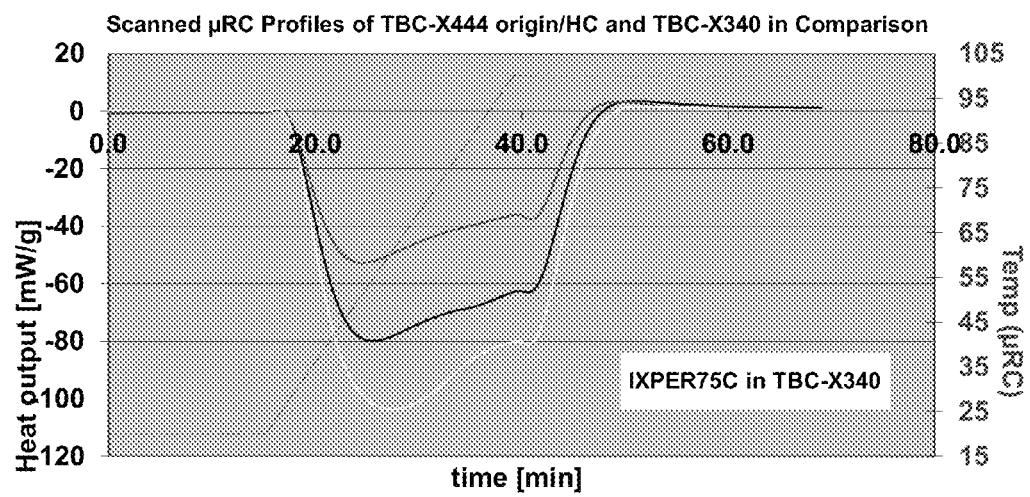
Figure 1: Calcium Peroxide Suspension Comparison.
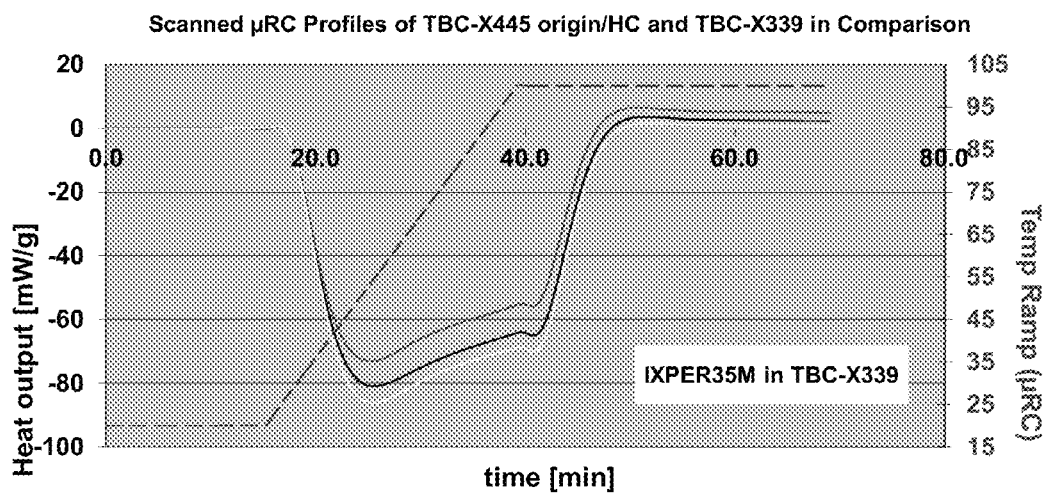
Figure 2: Magnesium Peroxide Suspension Comparison.

EARTH METAL PEROXIDE FLUIDIZED COMPOSITIONS

CROSS REFERENCE TO RELATED APPLICATIONS

This application claims priority to U.S. Provisional Patent application Ser. No. 61/595,106, filed Feb. 5, 2012, the contents of which are incorporated herein by reference in its entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to compositions and processes for use in downhole, subterranean operations, and more specifically are related to earth metal peroxide compositions for use in downhole hydrocarbon recovery operations.

Description of the Related Art

Fluids of various types are used in well working operations. One major use of fluids is in hydraulic fracturing, which is used to enhance the productivity of a well. Fracturing fluids typically have a high viscosity to generate a desired fracture geometry and to carry proppant into a formation. Water-based fracturing fluids usually utilize an additive which imparts sufficient viscosity to the fluid to maintain the proppant in suspension. Representative viscosifying additives include hydrophilic polysaccharide polymers such as guar gum, hydroxypropyl guar, or carboxymethyl hydroxypropyl guar. The hydrophilic polymer may also be crosslinked. Crosslinking increases the effective molecular weight of the polymer creating an enhanced viscosity of the aqueous fluid. Once the formation is fractured and the proppant placed, it is desirable to reduce the viscosity of the fluid so that it may be easily removed, thereby preventing damage to the formation and fracture permeability. Conventionally, this breaking of the aqueous gelled fluid is accomplished by continuously adding a viscosity breaker to the fluid during the fracturing operation.

Fracturing fluid breaker technology using dry powdered alkaline earth metal peroxides, such as magnesium peroxide and calcium peroxide is well known, but has several limitations. The fine particle sizes of magnesium peroxide ($MgO_2$) (D-10/1.2 microns, D-50/4.5 microns, D-90/257.2 microns) and calcium peroxide ($CaO_2$) (D-10/1.0 microns, D-50/4.3 microns, D-90/11.0 microns) is problematic during a continuous mix pumping operation. Poor dispersion of fine dry particles in the fracturing mixture, or loss of material due to windy atmospheric conditions can alter the required breaker concentration resulting in insufficient or erratic viscosity reduction, and significant damage to the permeability of the formation or the proppant pack placed by the fracturing fluid.

The inventions disclosed and taught herein are directed to improved compositions, systems, and methods for preparation and use of formation treating fluids for use in hydrocarbon recovery operations, wherein the compositions comprise one or more earth metal peroxides.

BRIEF SUMMARY OF THE INVENTION

Described herein are compositions useful in hydrocarbon recovery operations, the compositions comprising a hydrophobic liquid, an organophilic clay suspension agent, a polar activator, a sparingly-soluble alkaline earth metal peroxide, and an anionic surfactant, wherein the composition exhibits thermal stability above 200° F. In further aspects of this disclosure, the liquid of the composition is water insoluble, and in other aspects the liquid is a hydrocarbon. In further aspects of this embodiment, the hydrophobic liquid is present in at least from about 20 vol. % to about 90 vol. % of the total composition volume, and is present in amount sufficient to obtain a flash point greater than about 200° F. for the overall peroxide/synthetic fluid composition when tested in accordance with ASTM D-93.

In accordance with a further embodiment of the present disclosure, a thermally stable composition for use in hydrocarbon recovery operations is described, the composition comprising a hydrophobic fluid comprising a Group IV (API), Group V (API), or both a Group IV and a Group V category oil; a sparingly-soluble metal peroxide; and a surfactant; wherein the hydrophobic fluid has a kinematic viscosity at 40° C. ranging from about 2 cSt and about 10 cSt. In accordance with aspects of this embodiment, the hydrophobic fluid has a kinematic viscosity at 40° C. ranging from about 6 cSt to about 8 cSt. In further aspects of this embodiment, the composition exhibits a flash point greater than about 200° F. (93° C.) when tested in accordance with ASTM D-93.

In accordance with another embodiment of the present disclosure, a well treatment fluid is described, the well treatment fluid comprising a hydrophobic Group IV (API) or Group V (API) fluid, at least one sparingly-soluble metal peroxide, and an effective amount of a surfactant, wherein the fluid exhibits a flash point of 200° F. or more when tested in accordance with ASTM D-93. In further aspects of this embodiment, the hydrophobic fluid is present in at least from about 20 vol. % to about 90 vol. % of the total composition volume. In further accordance with aspects of this embodiment, the metal peroxide is calcium peroxide, magnesium peroxide, or a mixture thereof.

In a further embodiment of the present disclosure, a process for fracturing a subterranean formation is described, the process comprising admixing a Group IV or Group V hydrophobic fluid with a sparingly-soluble alkaline earth metal peroxide, a polar activator, and at surface level to form a pumpable fluid; and injecting under pressure the pumpable fluid into a well bore extending into the subterranean formation. In accordance with aspects of this embodiment, the pumpable fluid exhibits a flash point of 200° F. or more when tested in accordance with ASTM D-93. In further aspects of this embodiment, the hydrophobic fluid is present in an amount of at least from about 20 vol. % to about 90 vol. % of the total composition volume.

BRIEF DESCRIPTION OF THE SEVERAL VIEWS OF THE DRAWINGS

The following figures form part of the present specification and are included to further demonstrate certain aspects of the present inventions. The invention may be better understood by reference to one or more of these figures in combination with the detailed description of specific embodiments presented herein.

FIG. 1 illustrates exemplary micro reaction calorimetry profiles for calcium peroxide/synthetic fluid-based suspensions of the present disclosure.

FIG. 2 illustrates exemplary micro reaction calorimetry profiles for magnesium peroxide/synthetic fluid-based suspensions of the present disclosure.

While the inventions disclosed herein are susceptible to various modifications and alternative forms, only a few specific embodiments have been shown by way of example in the drawings and are described in detail below. The Figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

Definitions

The following definitions are provided in order to aid those skilled in the art in understanding the detailed description of the present inventions.

The term "admixing", as used herein, denotes mixing components in any order and/or any combination or sub-combination.

The term "alkali metal" as used herein refers to Group IA metals of the Periodic Table of the elements, including lithium, sodium, potassium, rubidium, and cesium.

The term "alkaline earth metal" as used herein refers to Group II metals of the Periodic Table of the Elements, such as calcium, magnesium, strontium and barium.

The term "combustible", as used herein, is used to describe a material that begins to burn upon contact with a small flame (e.g., a match flame), and can range from being easily- or substantially-combustible, to substantially non-combustible, and thus fire-resistant.

The term "calcium peroxide" as used herein refers to the compound having the formula $CaO_2\text{-}xH_2O$, where x=0-10. Calcium peroxide exhibits a solubility in water of 1.65 g/L at 20° C. (68° F.).

The term "magnesium peroxide" as used herein refers to the compound having the formula $MgO_2\text{-}xH_2O$, where x=0-10. Magnesium peroxide exhibits a solubility in water of 86 mg/L at 18° C. (64° F.).

The term "flash point", as used herein, refers to a measure of the tendency of a test specimen to form a flammable mixture with air under controlled laboratory conditions. It is one of a number of properties which are considered in assessing the overall flammability hazard of a material. Flash points can be determined using a variety of open- or closed-cup test methods, including but not limited to ASTM D-93 and DIN 51755.

The term "fluid", as used herein, refers to gas, liquid, vapor, suspensions, and combinations thereof.

The term "high flash point", or "non-volatile", as used herein, refers to liquids having a flash point of greater than about 212° F. (about 100° C.), and preferably a flash point at or above about 93° C. (about 200° F.).

As used herein, the term "hydrate" refers to a compound that is complexed to at least one water molecule. The compounds of the present disclosure can be complexed with from 1 to 10 water molecules.

The term "react", as used herein, refers to the process of effecting a molecular change, such as, for example, reacting calcium peroxide and water to produce hydrogen peroxide and calcium hydroxide.

As used herein, the term "peroxide" refers to any compound containing a bivalent O—O group, e.g., the oxygen atoms are univalent. The peroxy O—O group can be found in both inorganic and organic compounds. Examples of peroxides suitable for use with the presently disclosed subject matter can include, but are not limited to, hydrogen peroxide ($H_2O_2$), sodium peroxide ($Na_2O_2$), lithium peroxide ($Li_2O_2$), calcium peroxide ($CaO_2$), magnesium peroxide ($MgO_2$), barium peroxide ($BaO_2$), strontium peroxide ($SrO_2$), zinc peroxide ($ZnO_2$), transition metal peroxy metal compounds (e.g., $MoO(O_2)_2$), and percarbamide (i.e., urea peroxide). Per-acids are also included as peroxides. Examples of per-acids can include, but are not limited to, peracetic acid, performic acid, and persulfuric acid.

The term "soluble" or "solubility", as used herein, refers to the amount of a substance (e.g., a solid) that will dissolve in another substance (e.g., a liquid). Solubility is generally determined at temperatures between 15° C. and 25° C., and expressed as w/v. As used herein, solubility ranges of solute in liquid are as follows:

| | |
|---|---|
| Very soluble | 1 in less than 1* |
| Freely soluble | 1 in 1 to 1 in 10 |
| Soluble | 1 in 10 to 1 in 30 |
| Sparingly soluble | 1 in 30 to 1 in 100 |
| Slightly soluble | 1 in 100 to 1 in 1000 |
| Very slightly soluble | 1 in 1000 to 1 in 10,000 |
| Practically insoluble or insoluble | 1 in more than 10,000 |

*Refers to the weight of a substance that will dissolve in a volume of liquid, e.g., 1 in less than 1 can mean that 1 mg of a solid dissolves fully in less than 1 ml of an appropriate liquid.

Solubility ranges are available in published volumes, including the Merck Index: An Encyclopedia of Chemicals, Drugs, and Biologics (14$^{th}$ Ed., Merck Publishing, Whitehouse Station, N.J., USA: 2006), which is herein incorporated by reference.

Unless otherwise specified, all percentages are in weight percent (wt %).

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

Applicants have created compositions, useful in hydrocarbon recovery operations (such as hydraulic fracturing operations), the compositions comprising a hydrophobic liquid, an organophilic clay suspension agent, a polar activator, a sparingly-soluble alkaline earth metal peroxide, and an anionic surfactant, wherein the composition exhibits thermal stability above 200° F. In further aspects of this disclosure, the liquid of the composition is water insoluble, and in other aspects the liquid is a synthetic fluid. The thermal stability of Applicants composition is an important element as a flash point rating above 200° F. results in a formulation that provides greater safety in handling and operations, improved environmental factors and more economical packaging and shipping conditions.

In this description, the term "organophilic clay" (OC), as known to those skilled in the art, generally refers to a class of chemically modified clays having varying degrees of hydrophobicity as is known to those skilled in the art, and which are equivalently referred to as "thixotropic viscosifying agents." The clays may be derived from bentonite, hectorite, attapulgite, smectite, sepiolite, kaolinite, or other clay-type minerals, and may be prepared by known processes. More specifically, OCs generally refer to clays that have been treated to allow them to disperse and produce viscosity within various liquid hydrocarbons including but not limited to synthetic oils, olefins, distillates, vegetable and animal oils, esters and ethers of vegetable and animal oils and silica oils.

Suitable organophilic clays (OCs) for use with the compositions of the present disclosure also include the reaction products of smectite-type, hectorite clays, or other clays and organic cations, i.e., quaternary ammonium cations (sometimes referred to as organophillic clay gellants); smectite clays; kaolin clays; and the like. The preferred organophilic clays used as a thixotropic viscosifying agent, in accordance with one aspect of the present invention, is a smectite-type clay that is selected from the group consisting of bentonite, hectorite, montmorillonite, nontronite, biedellite, saponite, stevensite, and mixtures thereof, most preferably bentonite or hectorite. The preferred quaternary ammonium cations, in the event that the clay used is the reaction product of a clay and a quaternary ammonium compound, are selected from the group consisting of methyl trihydrogenated tallow ammonium, dimethyl dehydrogenated tallow ammonium, dimethyl benzyl hydrogenated tallow ammonium, methyl benzyl dehydrogenated tallow ammonium, and mixtures thereof. Exemplary organoclays and clay gellants suitable for use with the compositions described herein are set forth in the following U.S. patents, all incorporated herein by reference in relevant part: U.S. Pat. Nos. 2,531,427; 2,966,506; 4,105,578; and 4,208,218. Exemplary, commercially available organophilic clays suitable for use with the compositions described herein are CLAYTONE® IMG 400, available from Southern Clay Products, Inc., Gonzalez, Tex., U.S.A., or BENTONE® 38 Organoclay (a commercial hectorite-based product, available from a number of suppliers).

Polar activators may be added to the instant compositions, for obtaining proper dispersion and activation of the suspension agent, when the suspension agent used is an organophilic clay. Exemplary, non-limiting polar activators suitable for use with the compositions of the present disclosure include acetone, methanol, methanol/water, ethanol/water, propylene carbonate, acetonylacetone, diacetone alcohol, dimethyl formamide, and gamma-butyl lactone. Preferably, the polar activator is 1,2-propylene carbonate (4-methyl-1, 3-dioxolane-2-one).

Surfactants. Some fluids according to some embodiments may also include a surfactant, to prevent gellation or settling during formulation of the compositions. Nonlimiting examples of suitable surfactants that are present in embodiments of some fluids include cationic surfactants, anionic surfactants, zwitterionic surfactants, amphoteric surfactants, nonionic surfactants, and combinations thereof. Preferably, in accordance with select embodiments of the present disclosure, the surfactant is an anionic surfactant. Alternatively or additionally, any surfactant which aids the dispersion and/or stabilization of one or more components in the base fluid to form stabilized fluid can be used. Viscoelastic surfactants, such as those described in U.S. Pat. Nos. 6,703, 352 and 6,482,866, both incorporated herein by reference, are also suitable for use in fluids in embodiments of the invention.

Anionic surfactants suitable for use in forming the concentrates and compositions in accordance with the present invention include the alkali metal, alkaline earth metal, ammonium, or amine salts of various organic acids that function to lower the surface tension of a fluid. The preferred anionic surfactants include fatty acid soaps, alkyl sulfonates, alpha olefin sulfonates, alkyl ether sulfates and sulfonates, linear alkyl benzene sulfonates, aromatic sulfonates such as cumene, xylene and toluene sulfonates, olefin sulfonates, alcohol sulfates and sulfonates, and mixtures thereof. An exemplary anionic surfactant suitable for use with the compositions of the present disclosure is CST-7605D, available from Conlen Surfactant Technology (Conroe, Tex.).

Sparingly-soluble peroxides, suitable for use with the compositions of the present disclosure, are solid, sparingly-soluble peroxides of the alkaline earth metals which are sparingly-soluble in water. Suitable peroxides that are sparingly soluble in water include but are not limited to barium peroxide ($BaO_2\text{-}8H_2O$), calcium peroxide ($CaO_2\text{-}8H_2O$), magnesium peroxide ($MgO_2\text{-}8H_2O$), and strontium peroxide ($SrO_2\text{-}8H_2O$), as well as mixtures thereof, all of which contain from about 3% to 20% active oxygen content.

Particularly advantageous with respect to this invention is magnesium peroxide and calcium peroxide. The sparingly-soluble peroxides are suspended in the compositions described herein, in an amount of about 4 lb/gal, or 84 lb/bbl (dry concentration), so as to limit any hazardous issues that could arise from settling or agglomeration of the peroxide during transport and/or storage.

Due to the operational, health, and safety issues associated with the dispersion of fine, dry particles into the fracturing fluid, a preferred method of addition would be to utilize a liquid concentrate which could easily be mechanically metered into the system with accuracy. A hydrophobic, non-water soluble liquid should be used as the suspension medium, and should not affect the sparingly water-soluble oxidizer suspended therein.

The non-water soluble liquid should be a synthetic oil, and preferably the oleaginous fluid should be selected from the group including, but not limited to, oleaginous liquids having a high flash point and/or a high boiling point. The non-water soluble (hydrophobic) synthetic fluid is preferably selected from either a Group IV or Group V base oil category, as classified by the American Petroleum Institute (API), as set out in Table 1, and which specifications are included in the reference to the various groups of base oils in accordance with the present disclosure. Most preferably, the oil is a Group V chemically manufactured synthetic fluid, or a blend of a Group IV and a Group V.

TABLE 1

American Petroleum Institute (API) Base Oil Classifications.

| Group | Saturated Hydrocarbons, wt % (ASTM D-2007) | Sulfur, wt % (ASTM D 1552/ D 2622/D 3120/ D 4294/D 4927) | Viscosity Index, VI (ASTM D 2276) |
|---|---|---|---|
| I | <90 and/or | >0.03 | 80 ≤ VI < 120 |
| II | ≥90 | ≤0.03 | 80 ≤ VI < 120 |
| III | ≥90 | ≤0.03 | ≥120 |
| IV | Poly alpha olefins (PAO) | | |
| V | All other base oils not belonging to Groups I-IV | | |

The amount of base oil (equivalently referred to as hydrophobic base fluid) incorporated in the compositions of the present invention is preferably present in an amount of at least 60% wt., more preferably present in an amount in the range of from 60 to 98% wt, most preferably in an amount in the range of from 75 to 90% wt, with respect to the total weight of the fluidized peroxide composition. In accordance with further aspects of the present disclosure, the amount of hydrophobic base fluid in the compositions described herein in an amount of at least from about 20 vol. % to about 90 vol. % (inclusive) of the total composition volume.

By "Group I" base oil, "Group II" base oil, "Group III" base oil, "Group IV" base oil and "Group V" base oil in the present invention are meant oils according to the definitions of American Petroleum Institute (API) categories I, II, III, IV and V. Such API categories are defined in API Publication 1509, 15$^{th}$ Edition, Appendix E, April 2002.

Group I base oils contain less than 90% saturates (according to ASTM D2007) and/or greater than 0.03% sulphur (according to ASTM D2622, D4294, D4927 or D3120) and have a viscosity index of greater than or equal to 80 and less than 120 (according to ASTM D2270). Group I base oils are the least refined of all the groups, and they are usually a mix of different hydrocarbon chains with little or no uniformity.

Group II base oils contain greater than or equal to 90% saturates and less than or equal to 0.03% sulphur and have a viscosity index of greater than or equal to 80 and less than 120, according to the aforementioned ASTM methods. Group II base oils are common in mineral-based motor oils currently available on the market. They have fair to good performance in the areas of volatility, oxidation stability, and flash/fire points. They have only fair performance in areas such as pour point, cold crank viscosity, and extreme pressure wear.

Group III base oils contain greater than or equal to 90% saturates and less than or equal to 0.03% sulphur and have a viscosity index of greater than 120, according to the afore-mentioned ASTM methods. Group III base oils are subjected to the highest level of mineral oil refining of the base oil groups. Although they are not chemically engineered, they offer good performance in a wide range of attributes as well as good molecular uniformity and stability.

Synthetic fluids of the present disclosure, that fall within the Group IV and Group V classifications, refer to an oil whose molecules are assembled in a reaction from purified precursors in a synthesizing manufacturing process as opposed to an oil which is a processed fractional distillate. The molecules in the synthetic oil do not directly come from crude; they are manufactured by breaking down crude into purified single chemicals, then reassembling them. This is unlike the manufacturing method for Group I, II or older Group III base oil, which largely consist of molecules which can be found in the original crude.

Group IV base oils are chemically engineered base stocks. Poly alpha olefins are a common example of these synthetics, offering stable chemical compositions, highly uniform molecular chains, and improved performance.

Exemplary, non-limiting examples of suitable Group IV synthetic fluids include poly alpha olefins from C20 to C36, specifically dimers of C10 and C12 alpha olefins and trimers of C10 and C12 alpha olefins, linear alpha olefins from C6 to C30, and linear internal olefins from C6 to C30. Such fluids exhibit high flash points (flash points above 93° C., preferably above about 100° C.), low toxicity to soil bacteria and plants, a specific gravity ranging from 0.7 to 0.9, and kinematic viscosity ranges (as determined using ASTM D445) of between 200 cSt and 472 cSt at −40° C.; between 2.0 and 10 cSt at 40° C.; and/or between 1.0 cSt and 2.0 cSt at 100° C., preferably a kinematic viscosity at 100° C. less than 10 cSt. A commercially available synthetic fluid suitable for use in the present disclosure is DFS D24P02, available from SOLTEX, Inc. (Houston, Tex.), having a kinematic viscosity at 40° C. ranging from about 6 cSt to about 8 cSt. The kinematic viscosity can play a role in the overall fluid pumpability during hydraulic fracturing operations.

Group V base oils are chemically engineered base stocks that do not fall into Groups I, II, III or IV.

Exemplary, non-limiting examples of suitable Group V synthetic fluids include polyisobutylene, polybutylene, polyisobutene, polybutene from 350 to 6,000 molecular weight, and light oligomers of n-butene, n-butylene, isobutene and isobutylene from C8 to C24.

Generally, mixtures of an oxidizer with a flammable or combustible, reactive organic material would not be utilized for formulating a fluidized suspension due to the hazards associated with peroxide decomposition such as; oxygen release resulting in a serious pressure rise under confinement, or lowered flash point of organic vapors during the processing, storage, transportation, application, or even disposal periods.

The potential aftermath includes uncontrolled runaway reactions, fires, or explosions resulting in personal injury, damage and potential environmental impact. However, stable compositions for solid peroxide/synthetic fluid-based suspensions have been formulated with high flash points, elevated thermal stability, low heat generation, and a non-flammable rating per DOT, OSHA and NFPA regulations. The following testing was conducted to determine stability of the magnesium and calcium peroxide concentrate suspensions: flash point, thermal activity monitoring, and micro reaction calorimetry.

Flash Point.

The flash point provides a simple, convenient index for assessing the flammability of a wide variety of materials. Understanding the flammability characteristics of materials is critical to fire and explosion prevention and is an important element of a comprehensive hazard assessment process.

The flash point is the lowest temperature at which a flammable liquid will give off enough vapors to form an ignitable mixture with the air above the surface of the liquid or within its container. The vapor evolved may be flammable over a certain range of concentrations defined by the upper and lower flammable limits—the UFL and LFL respectively. The UFL and LFL define the range of flammable concentrations for a substance in air at atmospheric pressure. The limits of flammability may be used to specify operating, storage, and materials handling procedures for a material.

The U.S. Department of Transportation (DOT) establishes regulations relating to transportation of hazardous materials and has identified standards applicable to flammable and combustible liquids. The DOT requires that all substances transported have a flash point determined, and that any materials with flash points lower than 140° F. be handled with extra caution.

The U.S. Department of Labor regulation, OSHA 29 CFR 1910.106 mandates flash point determinations using one of the two standardized testing methods specified by the American Society for Testing and Materials (ASTM). The test methods open-cup and closed-cup both involve heating a sample in a small vessel to a selected temperature. A test flame or other ignition source is then introduced over the surface of the sample and it is noted whether or not ignition occurs. If not, the temperature is raised and the process is repeated until ignition occurs.

Open-cup testers simulate conditions in open vessels and during spills. One significant disadvantage of open-cup methods is that low boiling components of the sample may be lost to the atmosphere prior to application of the flame. Consequently, open-cup methods may overestimate the flash point of such samples.

Closed-cup techniques prevent the loss of low boiling components by keeping the sample enclosed until the ignition source is introduced. Additionally, an equilibrium between the liquid and the vapor is approximated within the vapor space, provided the rate of temperature increase is small. For these reasons, closed-cup flash point data is more conservative than, and generally preferred to, open-cup data.

OSHA 29 CFR 1910.106 (a) (14) (ii) specifies that a liquid which has a viscosity of 45 Saybolt Universal Seconds or more at 100° F., or contains suspended solids, or has a tendency to form a surface film while testing, should utilize test method ASTM D-93, entitled "Standard Test Methods for Flash Point by Pensky-Martens Closed-Cup Tester". Flash point classifications, as shown in Table 2, have been established for liquids using this test method.

TABLE 2

Occupational Safety and Health Administration (OSHA) Classifications.

| OSHA Class | Description |
| --- | --- |
| IA | Flammable with a flash point below 73° F. and a boiling point below 100° F. |
| IB | Flammable with a flash point below 73° F. and a boiling point at or above 100° F. |
| IC | Flammable with a flash point at or above 73° F. and below 100° F. |
| II | Combustible with a flash point at or above 100° F. and below 140° F. |
| III | Combustible with a flash point at or above 140° F. and below 200° F. |

The issue of flammability is directly linked to the degree of susceptibility of a compound, fluid, or composition to ignition and burning. A guide of the flammability hazard ratings can be found in the National Fire Protection Association (NFPA) publication no. 325, "Guide to Fire Hazard Properties of Flammable Liquids, Gases, and Volatile Solids", 1994 Edition. Additionally, the NFPA provides Flammability Hazard Ratings as defined in NFPA publication No. 704, "Standard System for the Identification of the Fire Hazards of Materials." To aid in the understanding of these NFPA ratings, the following summary is given, in Table 3 below:

TABLE 3

National Fire Protection Association (NFPA) Classifications.

| Class | Description |
| --- | --- |
| Class IA | Flammable with a flash point below 73° F. and a boiling point below 100° F. |
| Class IB | Flammable with a flash point below 73° F. and a boiling point above 100° F. |
| Class IC | Flammable with a flash point above 73° F. and a boiling point below 100° F. |
| Class II | Combustible with a flash point at or above 100° F. |
| Class III A | Combustible with a flash point at or above 140° F. |
| Class III B | Combustible with a flash point at or above 200° F. |

The following examples are included to demonstrate preferred embodiments of the invention. It should be appreciated by those of skill in the art that the techniques disclosed in the examples which follow represent techniques discovered by the inventor(s) to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the inventions.

EXAMPLES

Example 1

General Procedure for Preparation of Test Formulations

Exemplary test formulations using a synthetic fluid (DSF-D24P02, available from SOLTEX, Inc., Houston, Tex.), an organophilic clay suspension agent (Claytone IMG-400, available from Southern Clay Products, Gonzales, Tex.), a polar activator (Jeffsol PC, available from Huntsman Petrochemical Corp., The Woodlands, Tex.), an anionic surfactant (CST-7605D, available from Conlen Surfactant Technology, Conroe, Tex.), and a sparingly-soluble alkaline earth metal peroxide (IXPER®-75C, calcium peroxide and IXPER®-35M, magnesium peroxide, available from Solvay Chemicals Inc., Houston, Tex.) as set out in Table 4 were prepared in order to show thermal stability at temperatures above 200° F. The flash point determinations for the solid peroxide/synthetic fluid-based suspensions were performed utilizing test method ASTM D-93. The compositions in Table 6 were prepared to demonstrate critical thermal activity or serious de-composition behavior as determined by thermal activity monitoring (TAM) or heat flux scans up to 212° F. by micro reaction calorimetry (μRC).

TABLE 4

Flash Point Test Formulations.

| $CaO_2$ | | | $MgO_2$ | |
|---|---|---|---|---|
| 309.2 mL | DFS-D24P02 | 305.6 mL | DFS-D24P02 |
| 12.0 g | Claytone IMG-400 | 15.0 g | Claytone IMG-400 |
| 1.0 mL | Jeffsol PC | 1.0 mL | Jeffsol PC |
| 3.5 mL | CST-7605D | 3.0 mL | CST-7605D |
| 84.0 g | IXPER ®-75C | 84.0 g | IXPER ®-35M |

The results of the closed-cup flash determinations for both calcium and magnesium peroxide mixed with the compositions described herein are shown in Table 5, below. The average closed-cup flash point of the calcium peroxide/DFS-D24P02 is 209° F. and the magnesium peroxide/DFS-D24P02 is 225° F.

TABLE 5

Closed-Cup Flash Points for Calcium Peroxide and Magnesium Peroxide mixed in DSF-D24P02[1].

| | Flash Point Temperature, ° F. | |
|---|---|---|
| Test | $CaO_2$ | $MgO_2$ |
| 1 | 208 | 224 |
| 2 | 210 | 226 |

[1]ASTM D-93 Test Procedure

IXPER®-75C or IXPER®-35M powder were admixed into the viscosified synthetic fluids TBC-X340 (basis) and TBC-X339 (basis) generating an inorganic oxidizer content of 27% by weight in the TBC-X444 (origin) and TBC-X445 (origin) compositions. High concentrated suspensions, TBC-X444 (HC) and TBC-X445 (HC), with 42% by weight of IXPER®-75C or IXPER®-35M were also admixed to simulate the potential effects of settling/agglomeration of suspended peroxide solids during transport or storage.

The stability of the fluid compositions containing oxidizing compounds (e.g., peroxides) can be followed by analyzing the activity at intervals by measuring the TAM (Thermal Activity Monitoring) value, wherein the stability increases with decreases TAM value. A good storage life/stability is indicated by a low TAM value. The TAM value is a micro-calorimetric analysis of the energy released during storage, measured by means of the TAM® Thermal Activity Monitor available from Thermometric AB (Sweden). As the oxidizing compound degrades over time in the fluid, it gives off heat; the flow of this heat is measured as a TAM value in μW/g. A good stability or storage life of a composition is indicated by a low TAM value, preferably below about 60 μW/g for TA (40° C.) or below about 120 μW/g for TA (55° C.).

TABLE 6

Thermal Activity Monitoring and Micro Reaction Calorimetry Test Formulation.

| TBC-X340 (basis) | | TBC-X339 (basis) | |
|---|---|---|---|
| 309.2 mL | DFS-D24P02 | 305.6 mL | DFS-D24P02 |
| 12.0 g | Claytone IMG-400 | 15.0 g | Claytone IMG-400 |
| 1.0 mL | Jeffsol PC | 1.0 mL | Jeffsol PC |
| 3.5 mL | CST-7605D | 3.5 mL | CST-7605D |

| TBC-X444 (origin) | | TBC-X445 (origin) | |
|---|---|---|---|
| 321.2 mL | TBC-X340 (basis) | 318.9 mL | TBC-X339 (basis) |
| 99.1 g | IXPER ®-75C | 99.1 g | IXPER ®-35M |

| TBC-X444 (HC) | | TBC-X445 (HC) | |
|---|---|---|---|
| 321.2 mL | TBC-X340 (basis) | 318.9 mL | TBC-X339 (basis) |
| 198.2 g | IXPER ®-75C | 198.2 g | IXPER ®-35M |

The results of the thermal activity monitoring and micro reaction calorimetry tests for both calcium and magnesium peroxide mixed with the compositions described herein are shown in Tables 7-8 and FIGS. 1-2. Table 7 lists monitored average heat outputs in μW/g after 20 hours with all tested compositions showing a remarkable thermal stability/low heat generation even up to 55° C. (131° F.), which is significantly higher than either storage or surface application temperatures. FIGS. 1 and 2 show related scanned heat profiles in mW/g as a function of time in minutes. The overall endothermal profiles indicate a continuous heat flow from the surroundings into the sample vessel during ramping until an equilibrated system is regained at 100° C. (212° F.) after 69 minutes. The final outputs at 100° C. (212° F.) are very low for both original and high concentration peroxide compositions, ranging from 2.3 mW/g to 4.9 mW/g, with the maximum heat flux ranging from 3.6 mW/g to 6.4 mW/g for the same mixtures. The data, as presented in Table 8, indicates there is no exothermal decomposition or critical reaction behavior in the solid peroxide/synthetic fluid-based suspensions, even at elevated temperatures.

TABLE 7

Thermal Activity Monitoring (TAM) Heat Outputs/Activities.

| | | TAM | | | |
|---|---|---|---|---|---|
| Composition | Time (hr) | TA 40° C. (μW/g) | $Q_{40° C./20 hr}$ (J/g) | TA 55° C. (μW/g) | $Q_{55° C./20 hr}$ (J/g) |
| TBC - X340 (basis) | 20.0 | 20 | 1.4 | 22 | 4.3 |
| TBC - X444 (origin) | 20.0 | 27 | 2.4 | 58 | 5.6 |
| TBC - X444 (HC) | 20.0 | 54 | 4.3 | 114 | 10.6 |
| TBC - X339 (basis) | 20.0 | 24 | 1.6 | 23 | 4.4 |
| TBC - X445 (origin) | 20.0 | 12 | 1.0 | 50 | 4.0 |
| TBC - X445 (HC) | 20.0 | 20 | 1.7 | 91 | 6.9 |

TABLE 8

Heat Outputs for Peroxide/Synthetic Fluid-Based Suspensions.

| Composition | Heat Flux, mW/g | |
|---|---|---|
| | Maximum | Final[1] |
| TBC-X340 (basis) | 1.8 | 0.6 |
| TBC-X444 (origin) | 3.5 | 1.0 |
| TBC-X444 (HC) | 3.3 | 0.5 |
| TBC-X339 (basis) | 1.6 | 0.7 |
| TBC-X445 (origin) | 3.6 | 2.3 |
| TBC-X445 (HC) | 6.4 | 4.9 |

[1]Final output recorded at 69 minutes with a temperature of 100° C. (212° F.).

Other and further embodiments utilizing one or more aspects of the inventions described above can be devised without departing from the spirit of Applicants inventions. For example, combinations of earth metal peroxides may be used, of the same or different grind (particle) size. Further, the various methods and embodiments of the processes of manufacture can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, inter-lineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the inventions conceived of by the Applicants, but rather, in conformity with the patent laws, Applicants intend to fully protect all such modifications and improvements that come within the scope or range of equivalent of the following claims.

What is claimed is:

1. A composition consisting of:
   a hydrophobic liquid selected from one or more chemically manufactured Group IV and Group V category base oils, as classified by the American Petroleum Institute, and combinations thereof,
   an organophilic clay suspension agent,
   a polar activator,
   a sparingly-soluble alkaline earth metal peroxide, and
   an anionic surfactant.

2. The composition of claim 1, wherein the hydrophobic liquid is water insoluble.

3. The composition of claim 1, wherein the suspension agent is an organophilic clay.

4. The composition of claim 1, wherein the polar activator is propylene carbonate.

5. The composition of claim 1, wherein the earth metal peroxide is calcium peroxide, magnesium peroxide, or a mixture thereof.

6. The composition of claim 1, wherein the hydrophobic liquid is present in an amount which is:
   a) at least from about 20 vol. % to about 90 vol. % of the total composition volume, and
   b) is sufficient to obtain a flash point greater than 200° F. for the peroxide/synthetic fluid composition when tested in accordance with ASTM D-93.

7. The composition of claim 1, wherein the composition exhibits a flash point greater than 200° F. when tested in accordance with ASTM D-93.

8. A thermally stable composition for use in hydrocarbon recovery operations, the composition consisting of:
   a hydrophobic fluid selected from a Group IV (API), Group V (API), or both a Group IV and a Group V category oil;
   a sparingly-soluble metal peroxide; and
   a surfactant;
   wherein the hydrophobic fluid has a kinematic viscosity at 40° C. ranging from about 2 cSt and about 10 cSt.

9. The thermally stable composition of claim 8, wherein the hydrophobic fluid has a kinematic viscosity at 40° C. ranging from about 6 cSt to about 8 cSt.

10. The thermally stable composition of claim 8, wherein the composition exhibits a flash point greater than about 200° F. when tested in accordance with ASTM D-93.

11. The thermally stable composition of claim 8, wherein the sparingly-soluble metal peroxide is calcium peroxide, magnesium peroxide, or a mixture thereof.

12. The thermally stable composition of claim 8, wherein the surfactant is an anionic surfactant.

13. The thermally stable composition of claim 8, wherein the composition exhibits a heat output of 60 µW/g or less as determined by Thermal Activity Monitoring at 40° C. over 20 hours.

14. A well treatment fluid consisting of:
    a Group IV (API) or Group V (API) fluid;
    at least one sparingly-soluble metal peroxide; and
    an effective amount of a surfactant,
    wherein the fluid exhibits a flash point of 200° F. or more when tested in accordance with ASTM D-93.

15. The well treatment fluid of claim 14, wherein the metal peroxide is calcium peroxide, magnesium peroxide, or a mixture thereof.

16. The well treatment fluid of claim 14, wherein the surfactant is an anionic surfactant.

* * * * *